No. 798,741. PATENTED SEPT. 5, 1905.
J. E. MANNIX.
FILTER.
APPLICATION FILED OCT. 12, 1904.
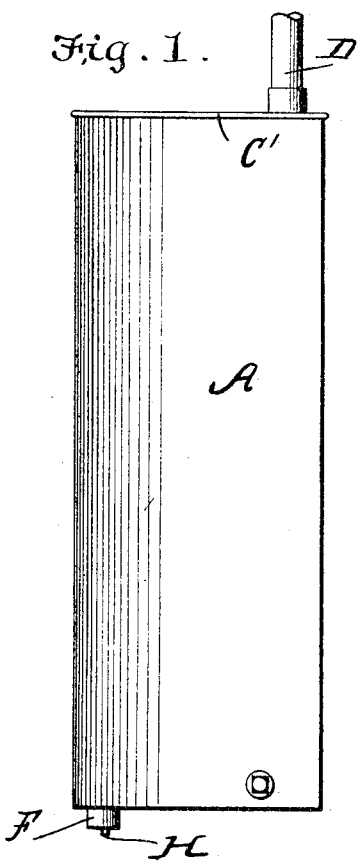
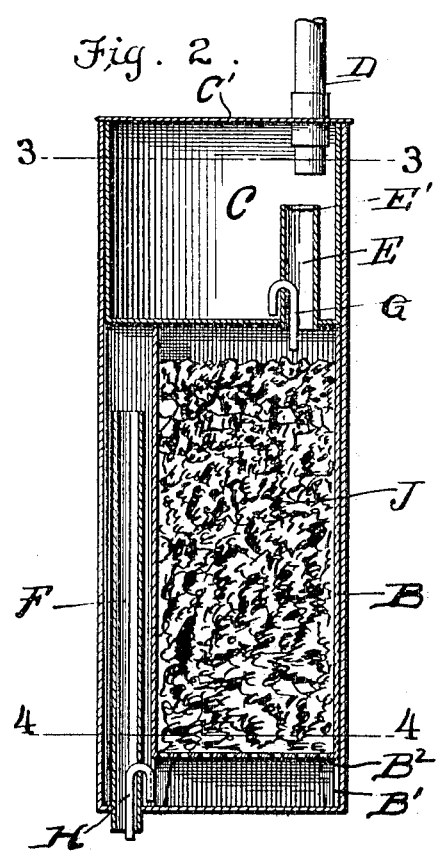
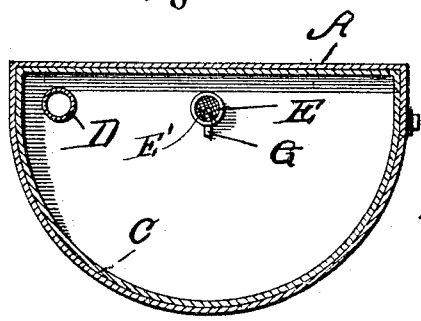
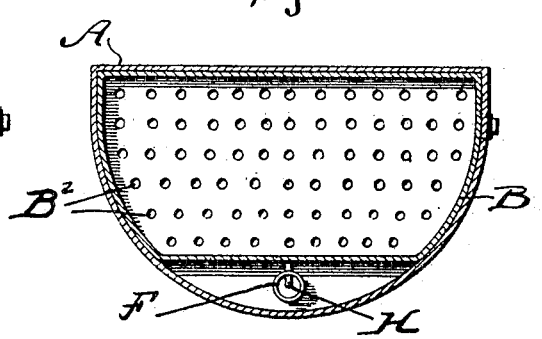
Witnesses
Ernest Pulsford
Edgar B. McBath
Inventor
J. E. Mannix
By Munn & Brock
Attorneys

UNITED STATES PATENT OFFICE.

JAMES E. MANNIX, OF LANCASTER, KENTUCKY.

FILTER.

No. 798,741.  Specification of Letters Patent.  Patented Sept. 5, 1905.

Application filed October 12, 1904. Serial No. 228,205.

*To all whom it may concern:*

Be it known that I, JAMES E. MANNIX, a citizen of the United States, residing at Lancaster, in the county of Garrard and State of Kentucky, have invented a new and useful Improvement in a Filter, of which the following is a specification.

My invention relates to a self-draining filter adapted for use either in a building, water being supplied to the filter from any suitable source, or to a cistern, the filter being arranged in the cistern and the water supplied to the cistern passing through the filter.

The object of the invention is a device of this kind in which the water will be settled twice, once before passing through the body of filtering material and again after being filtered, and which will be self-draining, so that no water will be allowed to stand in the filter, but at the same time the sediment will be prevented from escaping through the drains.

My invention consists in the novel features of construction and combination of parts hereinafter described, particularly pointed out in the claims, and shown in the accompanying drawings, in which—

Figure 1 is a side elevation of my device. Fig. 2 is a vertical longitudinal section. Fig. 3 is a section on the line 3 3 of Fig. 2. Fig. 4 is a section on the line 4 4 of Fig. 2, the charcoal being removed.

In constructing my device I employ a casing A, of any desired shape, size, and material, in which is arranged a charcoal-receptacle B, supported above the bottom of the casing A by means of supporting brackets or legs B', and the bottom of the receptacle B is perforated, as shown at B². The upper end of the receptacle B is closed by a water-receiving receptacle C, which fits snugly within the casing A and rests upon the receptacle B. The top C' of the receptacle C is flanged and fits over the upper edge or rim of the casing A, thus entirely closing the top of the casing. A supply-pipe D is carried by the top C' and discharges into the receptacle C adjacent one side of the same. An upwardly and downwardly open pipe E is carried by the bottom of the receptacle C, extending upwardly into the said receptacle and is out of alinement with the supply-pipe D. The receptacle B is of less diameter in one direction than the casing A, and a discharge-pipe F, open at both ends, passes through the bottom of the casing A and extends upwardly between a side wall of said casing and the receptacle B. A siphon G is arranged in the pipe E, the short leg of the siphon passing through the pipe E and opening downwardly into the receptacle C adjacent the bottom of the same, the long leg of the siphon passing downwardly within the pipe E and discharging into the receptacle B. A similar siphon H is arranged in the lower end portion of the pipe F, discharging outwardly through the lower end of the said pipe and draining the casing A. Charcoal or any other suitable filtering material is placed in the receptacle B.

Water entering the pipe D will fill the receptacle C to the level of the top of the pipe E, through which it will pass into the receptacle B, discharging from said receptacle into the bottom of the casing A through the perforations B² and rising in the space of the casing A, in which is arranged the pipe F, will flow into the upper end of the pipe and be discharged into the cistern. It will be obvious that sediment will settle first upon the bottom of the receptacle C, and all of the heavier particles will be prevented from passing into the filtering material J. All the heavy particles which may be carried out of the filter by the passage of the water therethrough will settle in the bottom of the casing A while the water drains off through the pipe F. In order, however, to prevent water from standing in the receptacle C and also in the casing A continuously to the level of the pipes E and F, respectively, the siphons G and H are employed, and this will drain off the water without permitting the escape of the sediment, as would be the case if a mere straight drainage pipe or aperture were provided. The receptacle C can be readily and quickly removed, as can also be the receptacle B, and the parts can be cleaned and the filtering matter renewed without difficulty. A screen E' is placed over the pipe E, but may of course be omitted if not desired.

Having thus fully described my invention, what I claim as new, and desire to secure by Letters Patent, is—

1. A filter comprising a receptacle adapted to contain filtering material, said receptacle having a perforated bottom, a water-receiving receptacle, a pipe extending upwardly into the last-mentioned receptacle and opening downwardly into the filtering-receptacle, and the siphon arranged in said pipe, the short leg of the siphon extending into the water-receiving receptacle and adapted to drain the same into the first-mentioned receptacle.

2. A device of the kind described comprising a casing, a receptacle arranged in said casing and having a perforated bottom elevated above the bottom of the casing, a water-receiving receptacle resting upon the receptacle first mentioned, a pipe carried by the bottom of the water-receiving receptacle and extending upwardly into the said receptacle and opening downwardly into the receptacle first mentioned, a vertically-arranged pipe opening downwardly through the bottom of the casing and extending upwardly into the casing between the first-mentioned receptacle and a wall of the casing, a siphon in each pipe, as and for the purpose set forth.

JAMES E. MANNIX.

Witnesses:
 LEWIS L. WALKER,
 D. D. GRIGER.